United States Patent [19]

Momose et al.

[11] Patent Number: 5,738,906

[45] Date of Patent: Apr. 14, 1998

[54] METHOD FOR PRODUCING A MAGNETIC DISK

[75] Inventors: Toru Momose, Yonezawa; Tsuneo Manabe, Yokohama; Yuzo Murayama, Yonezawa; Yoshizumi Hideshima, Yokohama, all of Japan

[73] Assignee: AG Technology Co., Ltd., Yokohama, Japan

[21] Appl. No.: 624,801

[22] Filed: Mar. 27, 1996

[30] Foreign Application Priority Data

Mar. 31, 1995 [JP] Japan .................................. 7-076128

[51] Int. Cl.$^6$ ........................................ B05D 5/12
[52] U.S. Cl. .................... 427/131; 427/129; 427/130; 427/131; 427/264; 427/270; 427/299; 427/346; 427/385.5; 427/404; 427/407.1; 427/419.2
[58] Field of Search ............................. 427/128–132, 427/264, 270, 299, 346, 385.5, 404, 407.1, 419.2

[56] References Cited

FOREIGN PATENT DOCUMENTS

| | | |
|---|---|---|
| 57-167135 | 10/1982 | Japan . |
| 62-256214 | 11/1987 | Japan . |
| 63-86116 | 4/1988 | Japan . |
| 63-167422 | 7/1988 | Japan . |
| 64-33724 | 2/1989 | Japan . |

*Primary Examiner*—Bernard Pianalto
*Attorney, Agent, or Firm*—Oblon, Spivak, McClelland, Maier & Neustadt, P.C.

[57] ABSTRACT

A method for producing a magnetic disk having a surface roughness in the entire portion of its main surface in which the peak height of the surface roughness in a data zone of the magnetic disk is lower than the peak height of the surface roughness in a CSS zone of the magnetic disk, wherein forming a magnetic disk substrate having the main surface in which a surface roughness having a substantially uniform peak height is formed in the substantially entire portion of the main surface; conducting varnishing only to the data zone in the main surface of the substrate having the surface roughness to lower the peak height of the surface roughness of the data zone; and forming a ferromagnetic layer, a protective layer and a lubricant layer sequentially on a region of the main surface of the substrate, which includes the data zone and the CSS zone.

19 Claims, No Drawings

METHOD FOR PRODUCING A MAGNETIC DISK

BACKGROUND OF THE INVENTION

1. Field of the Invention

The present invention relates to a method for producing a magnetic disk.

2. Discussion of Background

In recent years, a demand for increasing the memory capacity of a fixed type magnetic disk as a kind of an external memory device has been remarkable with wide use of computers. As an attempt to increase the memory capacity, reduction of flying height has been tried for a magnetic head.

On the other hand, a CSS (contact start-stop) type magnetic disk is so adapted that a magnetic head is separated from the main surface of the magnetic disk or is brought to contact with the same in a CSS zone when the magnetic disk is started or stopped. In this case, the magnetic disk is beforehand applied with a surface-roughening treatment (a texturing treatment) on its surface area so that the magnetic head dose not stick to or collide with the magnetic disk surface. As described above, it is preferable that a magnetic head flies above the magnetic disk surface as low as possible from the viewpoint of increasing the memory capacity. However, when the degree of surface roughness on the surface is too high, the flying of the magnetic head at a low height level is not obtained. In particular, if there is a large projection on the magnetic disk surface, the magnetic head hits the projection during the flying to damage the magnetic disk surface or to cause crushing of the magnetic head.

As a method which satisfies both requirements of low flying height and prevention of the sticking of the magnetic head, there have been tried to reduce the degree of surface roughness as possible while the sticking of the magnetic head and a damage of the magnetic disk can be minimized. However, in the conventional techniques, there was a limit to attain low flying height.

As a method for solving the above problem, there has been proposed a method for realizing the requirement of low flying height, which is a so-called zone texturing method or a partial texturing method, wherein a surface roughness is formed to the extent that the sticking and damaging between the magnetic head and the magnetic disk can be prevented, only in the CSS zone in which the magnetic head is separated from the magnetic disk surface, or it is brought into contact with the surface (for instance, a disk surface area near the inner circumference of a doughnut-shaped magnetic disk or a disk surface area near the outer circumference of it).

As the method for forming a surface roughness on a part of the main surface of a magnetic disk substrate, there have been known a method for changing the degree of applying polishing in a part of the surface (Japanese Unexamined Patent Publication No. 167135/1982); a method for forming a surface roughness in a part of the surface by means of a mask (Japanese Unexamined Patent Publication No. 256214/1987); a method for etching a mask material after a pattern printing (Japanese Unexamined Patent Publication No. 86116/1988), and a method for conducting an etching treatment in a part of the surface (Japanese Unexamined Patent Publication No. 167422/1988). In any of the known methods, there was limitation in forming a fine surface roughness having a controlled shape of projection in a controlled area with good producibility.

SUMMARY OF THE INVENTION

It is an object of the present invention to provide a method for producing a magnetic disk having a surface roughness in the substantially entire portion of its main surface wherein the peak height in a data zone is lower than the peak height in a CSS zone, with good producibility, whereby both requirements of a CSS resisting characteristic and low flying height are attainable and a magnetic disk having a high memory capacity can be produced.

In accordance with the present invention, there is provided a method for producing a magnetic disk having a surface roughness in the substantially entire portion of its main surface in which the peak height of the surface roughness in a data zone of the magnetic disk is lower than the peak height of the surface roughness in a CSS zone of the magnetic disk, characterized in that forming a magnetic disk substrate having the main surface in which a surface roughness having a substantially uniform peak height is formed in the substantially entire portion of the main surface; conducting varnishing only to the data zone in the main surface of the substrate to reduce the peak height of the surface roughness of the data zone; and forming a ferromagnetic layer, a protective layer and a lubricant layer sequentially on a region of the main surface of the substrate, which includes the data zone and the CSS zone.

In accordance with the present invention, there is provided a method for producing a magnetic disk having a surface roughness in the substantially entire portion of its main surface in which the peak height of the surface roughness in a data zone of the magnetic disk is lower than the peak height of the surface roughness in a CSS zone of the magnetic disk, characterized in that:

forming a magnetic disk substrate having the main surface on which a ferromagnetic layer is formed;

forming a surface roughness having a uniform peak height in the substantially entire portion of the main surface of the ferromagnetic layer;

conducting varnishing only to the data zone to reduce the peak height of the surface roughness of the data zone, and forming a lubricant layer on a region of the main surface of the substrate, which includes the data zone and the CSS zone.

In accordance with the present invention, there is provided a method for producing a magnetic disk having a surface roughness in the entire portion of its main surface in which the peak height of the surface roughness in a data zone of the magnetic disk is lower than the peak height of the surface roughness in a CSS zone of the magnetic disk, characterized in that:

forming a magnetic disk substrate having the main surface in which a surface roughness having a substantially uniform peak height is formed in the substantially entire portion of the main surface;

applying a coating solution for forming a coating layer, preferably an amorphous coating layer, only to the data zone in the main surface having the surface roughness of the substrate to thereby reduce the peak height of the surface roughness of the data zone, and forming a ferromagnetic layer, a protective layer and a lubricant layer, preferably, an undercoat layer, a ferromagnetic layer, a protective layer and a lubricant layer, sequentially on a region of the main surface of the substrate, which includes the data zone and the CSS zone.

In accordance with the present invention, there is provided a method for producing a magnetic disk having a surface roughness in the entire portion of its main surface in which the peak height of the surface roughness in a data zone of the magnetic disk is lower than the peak height of the surface roughness in a CSS zone of the magnetic disk, characterized in that:

forming a ferromagnetic layer, preferably, an undercoat layer, a ferromagnetic layer and a protective layer, sequentially on the main surface of the magnetic disk substrate;

forming a surface roughness having a substantially uniform peak height on the entire portion of the main surface;

applying a coating solution for forming a coating layer, preferably an amorphous coating layer only to the data zone to thereby reduce the peak height of the surface roughness of the main surface of the data zone, and forming a lubricant layer in a region of the main surface of the substrate, which includes the data zone and a CSS zone.

DETAILED DESCRIPTION OF PREFERRED EMBODIMENTS

In the present invention, varnishing, i.e. a treatment for polishing the substrate surface with use of a varnishing tape, is preferably used since a surface roughness can be formed correctly and with good reproducibility only in the data zone of the magnetic disk to reduce the peak height of the surface roughness and a danger of causing flaws on the main surface of the magnetic disk substrate is minimized.

Such varnishing can be achieved by bringing the varnishing tape into contact with the main surface of the magnetic disk substrate rotated at a predetermined rotating speed while abrasive grains are supplied to the surface whereby projecting portions in the surface roughness formed on the substrate surface are polished, or by bringing a moving varnishing tape into contact with the main surface of the magnetic disk substrate while abrasive grains are supplied whereby projecting portions in the surface roughness are polished. In particular, such a method that a varnishing tape held under tension is brought to contact with the substrate surface by means of a gas pressure is desirable since the peak height in the surface roughness can be uniformly reduced without producing flaws on the substrate surface.

Material for the tape and the particle size of abrasive grains used for the varnishing are not in particular limited. However, the average particle size of the abrasive grain is preferably in a range of 0.3 µm–2 mm, more preferably, in a range of 0.4 µm–1.2 µm.

In the present invention, the CSS zone is generally formed to have an annular shape with a predetermined width in an inner circumference or an outer circumference of the main surface of a doughnut-shaped magnetic disk. The above-mentioned varnishing is selectively conducted to the data zone excluding the CSS zone whereby the peak height of the surface roughness of the data zone is reduced. The degree of surface roughness formed on the main surface of the magnetic disk substrate which is to be applied with the varnishing is not in particular limited so long as the peak height can be reduced by the varnishing.

The method for forming a surface roughness on its main surface of a magnetic disk substrate may be a method for applying a coating solution including dispersed inorganic fine particles onto the main surface of the substrate to form a coating layer having a fine surface roughness on the substrate surface (for instance, a method for coating on the magnetic disk substrate surface a coating solution which is prepared by dispersing inorganic fine particles such as silica, alumina, titania, zirconia or the like having an average particle size of primary particles of about 50 Å–800 Å in a sol liquid prepared by hydrolysis and polycondensation of a metal alkoxide solution, followed by baking the coating layer to form an amorphous coating layer having a fine surface roughness on the magnetic disk substrate); a method for forming a fine surface roughness on the substrate surface by polishing the surface with a varnishing tape, or a method for forming a fine surface roughness on the substrate surface by depositing, in an island form, fine particles on the surface by a sputtering method.

In particular, it is desirable to use a magnetic disk substrate having a surface roughness composed of an amorphous coating layer including dispersed inorganic fine particles in order to uniformly reducing easily and accurately the peak height of the surface roughness without causing flaws on the main surface of the substrate by contacting and polishing the varnishing tape with the surface roughness formed on the main surface of the substrate when the varnishing is conducted. The amorphous coating layer having a surface roughness is a layer of high durability in mechanical and chemical sense and is the most suitable for a layer formed on the main surface of the magnetic disk substrate.

The amorphous coating layer having a surface roughness can be easily obtained by coating a coating solution including dispersed inorganic fine particles on the main surface of the magnetic disk substrate, followed by baking the coating layer by heating. For instance, coating solution for forming an amorphous coating layer formed by a sol-gel reaction of a metal alkoxide such as Si, Ti, Al, Zr or the like or a hydrolyzed product thereof and inorganic fine particles of an oxide of Si, Ti, Al, Zr or the like or a mixture thereof, is preferably used. Such amorphous coating layer having a surface roughness composed of the inorganic materials is a film of high durability in mechanical and chemical sense and is suitable for forming a surface roughness on the main surface of the magnetic disk substrate.

As a method of applying the coating solution, a suitable method, e.g. a printing method such as flexograph printing method, a transfer method, a screen-printing method which can form a thin coating layer by applying the coating solution on the main surface of the magnetic disk substrate or a spin-coating method, or a method of coating with use of cloth impregnated with the coating solution, can be selected.

The coating layer applied to the magnetic disk substrate is dried to remove solvent and baking the coat by heating at 150° C. or more, e.g., 150° C.–600° C., whereby a coating layer having excellent surface hardness, mechanical strength and chemical characteristics is formed.

When such amorphous coating layer having a surface roughness is formed on the main surface of the magnetic disk substrate, such structure of surface roughness can be reproduced on the main surface of the magnetic disk even when a ferromagnetic layer and a lubricant layer are sequentially formed on the coating layer by sputtering, or an undercoat layer, a ferromagnetic layer, a protective layer and a lubricant layer are sequentially formed on it.

Further, a magnetic disk having a predetermined surface roughness structure on its main surface can be produced by forming an undercoat layer (if necessary), a ferromagnetic layer, a protective layer (if necessary), an amorphous coating layer having a surface roughness on its main surface, a protective layer (if necessary) and a lubricant layer sequentially on the magnetic disk substrate.

In the present invention, when a surface roughness is formed by the above-mentioned coating method, the coating layer having a surface roughness may be formed directly or by interposing an undercoat layer on a magnetic disk substrate of non-magnetic substance. Or, a ferromagnetic layer is formed by interposing or without interposing an undercoat layer on the main surface of the magnetic disk substrate of non-magnetic substance, and a coating layer having a surface roughness on its main surface is formed by the above-mentioned method by interposing or without interposing an anti-corrosion layer and a protective layer between the ferromagnetic layer and the coating layer. It is not always necessary to form the coating layer having a surface roughness by using the above-mentioned coating method. The surface roughness structure can be formed at any of the interfaces in the multi-layered structure formed on the magnetic disk substrate of non-magnetic substance so long as a suitable surface roughness structure can be formed on the main surface of the magnetic disk substrate.

In the present invention, the CSS zone is formed in an annular shape with a predetermined width in an inner circumferential region and an outer circumferential region in the main surface of a doughnut-shaped magnetic disk, and the above-mentioned varnishing is selectively conducted to the data zone excluding the CSS zone, whereby the peak height of the surface roughness on the main surface of the data zone is reduced.

As conventionally used methods for forming a surface roughness on the main surface of a magnetic disk substrate, there are a method for polishing the main surface of the substrate with an abrasive tape to form a fine surface roughness on the main surface; a method, for forming a fine surface roughness on the main surface by depositing fine particles in an island form on the main surface of the substrate by a sputtering method, and a method for forming a coating layer having a fine surface roughness on its main surface by applying a coating solution including dispersed inorganic fine particles (for instance, a method for forming an amorphous coating layer having a fine surface roughness by applying on the main surface of a magnetic disk substrate a coating layer in which inorganic fine particles such as silica, alumina, titania or zirconia or a mixture thereof having an average particle size of primary particles of 50 Å–800 Å are dispersed in a sol liquid prepared by hydrolysis and polycondensation of a metal alkoxide solution, and baking the coating layer). It has been known that when a thin film is formed by, for instance, sputtering on the surface of the thus formed surface roughness on the substrate, the thin film itself grows to have a uniform thickness irrespective of the substrate having a roughened surface, and the shape of the surface roughness can well be reproduced on the thin film. Accordingly, it is not easy to change the shape of the surface roughness by using the sputtering method.

However, the inventors of this application have preferably found that when an amorphous coating layer is formed by applying on a surface roughness on the substrate a coating solution including, for instance, a metal alkoxide or a hydrolyzed product of the same, the shape of the surface roughness is changed, in particular, the peak height of the surface roughness is reduced. It is considered that when the coating solution is applied onto the magnetic disk substrate, a film is not substantially formed on the projections of the surface roughness and a film is selectively formed only in the recessed portions, whereby the peak height of the surface roughness is reduced.

In the application of the above-mentioned principle, it was possible to reduce the peak height of a surface roughness and to reduce the flying height of a magnetic head in a region having a reduced peak height, by forming the surface roughness having excellent CSS resisting characteristics in the entire area of the main surface of a magnetic disk substrate and applying the above-mentioned coating solution only in a predetermined data zone to form an amorphous coating layer.

By forming such amorphous coating layer having a preferred surface roughness on the main surface of the magnetic disk substrate, the structure of the surface roughness can be reproduced as a surface roughness structure on the main surface of the magnetic disk even when a ferromagnetic layer and a lubricant layer are sequentially formed on the surface roughness structure by sputtering, or even when an undercoat layer, a ferromagnetic layer, a protective layer and a lubricant layer are sequentially formed on it.

Further, a magnetic disk having a desired surface roughness structure can be produced by forming an undercoat layer (if necessary), a ferromagnetic layer, a protective layer (if necessary), an amorphous coating layer having a surface roughness on its main surface, a protective layer (if necessary) and a lubricant layer sequentially on the main surface of the magnetic disk substrate.

If there is an advantage of improving the characteristics or increasing production efficiency, a ferromagnetic layer may be formed on the magnetic disk substrate having a surface roughness structure in the entire surface and an amorphous coating layer may be formed in a data zone on the ferromagnetic layer.

Material for the coating layer may be an amorphous material or a crystalline material, and is not in particular limited so long as the above-mentioned object is attainable. However, the amorphous material is preferably used since the coating layer can be selectively formed at the recessed portions in the surface roughness structure and a film having high mechanical strength is obtainable. In particular, it is preferable to use material capable of forming an amorphous coating layer by a hydrolysis reaction of a metal alkoxide as the main material.

As the method for forming the coating layer, a method for coating on the main surface having a surface roughness of the substrate a coating solution including a metal alkoxide or a hydrolyzed product of it, for instance. As the method for selectively applying the coating solution only in the data zone, a printing method such as a flexographic printing method, a transfer method, a screen printing method or the like is suitably used. Further, the coating solution may be applied to the data zone with use of cloth impregnated with the coating solution. Further, when a magnetic disk having a CSS zone near its inner circumference is used, the coating solution can be applied to the inner circumferential side of a data zone by a spin-coating method.

Further, a so-called lift-off method may be used to form a data zone having a predetermined pattern wherein a water-soluble material or an organic solvent-soluble material as a masking film forming material is applied to a portion corresponding to a CSS zone in a magnetic disk substrate in which a surface roughness is previously formed in its entire surface to have a predetermined pattern by a printing method or a coating method; a coating solution capable of forming an amorphous coating layer is coated on the entire surface of the magnetic disk substrate by a dipping method, a spin-coating method, a flexographic printing method or the like to thereby form an amorphous coating layer; the amorphous coating layer is washed with water or an organic solvent to remove a masking film soluble to water or an organic solvent as well as the amorphous coating layer formed at the masking film.

In the method for producing a magnetic disk in the present invention, the CSS zone is formed in an annular shape with a predetermined width in an inner circumferential region or an outer circumferential region of the main surface of a doughnut-shaped magnetic disk, and a coating solution is applied to the region of a data zone excluding the CSS zone by the above-mentioned printing method to reduce the peak height of the surface roughness structure of the data zone. Or, the above-mentioned masking film is formed in the CSS zone which is formed to have an annular shape with a predetermined width in the entire region of the inner circumferential region or an outer circumferential region of the doughnut-shaped magnetic disk.

The coating solution applied to the magnetic disk is dried to remove solvent and heated at 150° C.–500° C. whereby a coating film having excellent mechanical strength is obtainable.

As described above, the method of the present invention is effectively used regardless of the shape of a surface roughness structure formed on the main surface of the magnetic disk substrate. When an amorphous coating layer having a surface roughness is to be formed by using a coating solution in which inorganic fine particles are dispersed, the same kind of material is used for the coating solution applied to reduce the peak height of the surface roughness in the main surface of the data zone and the coating solution to form the surface roughness as described above. This provides advantages of increasing the bonding strength between the coating layers and simplifying the manufacturing steps. In a case of forming a surface roughness by a coating method as described above in the present invention, the coating layer may be formed directly on or by interposing an undercoat layer on a magnetic disk substrate of non-magnetic substance. Or, the coating layer having a surface roughness may be formed after an undercoat layer, a magnetic recording layer, an anti-corrosion layer and a protective layer have been sequentially formed on the main surface of a magnetic disk substrate of non-magnetic substance wherein the undercoat layer and/or the anti-corrosion layer and/or the protective layer may be omitted.

In a case of forming the surface roughness by the above-mentioned coating method, the coating layer having a surface roughness is not limited to as described above, but may be formed in any interface portion in the multi-layered structure which is formed on the magnetic disk substrate of non-magnetic substance so long as the coating layer provides a suitable surface roughness structure on the main surface of the magnetic disk.

For the ferromagnetic layer as a magnetic recording layer used in the present invention, a Co alloy series magnetic recording material such as a Co-Cr series, a Co-Cr-Pt series, a Co-Ni-Cr series, a Co-Ni-Cr-Pt series, a Co-Ni-Pt series, a Co-Cr-Ta series or the like is preferably used. For the undercoat layer formed below the ferromagnetic layer to improve the durability and the magnetic characteristics, an undercoat layer such as a Ni undercoat layer, a Ni-P undercoat layer, a Cr layer, a $SiO_2$ layer or the like may be formed.

In the present invention, a Cr layer, a Cr alloy layer, a metallic or alloy layer composed of another material having anti-corrosion characteristics may be formed on or below the ferromagnetic layer.

The magnetic disk substrate used in the present invention should be such one composed of at least one selected from the group consisting of glass, crystal glass, carbon, non-magnetic metal such as Al and these materials having a coated main surface.

Further, in the present invention, various types of functioning film may be formed if necessary in addition to the ferromagnetic layer, the protective layer, the lubricant layer, the undercoat layer and the anti-corrosion layer.

The shape of the surface roughness formed on the main surface of the magnetic disk substrate is such that the maximum peak height of the surface roughness in the main surface of the CSS zone is from 150 Å to 800 Å based on the highest frequency in the height distribution of the surface roughness, and the maximum peak height $h_1$ of the surface roughness in the main surface of the data zone and the maximum peak $h_2$ of the surface roughness in the main surface of the CSS zone have a relation of $0.4 \leq h_1/h_2 < 0.9$. Accordingly, both requirements of excellent CSS resisting characteristics and a low flying height of magnetic head can be satisfied and stability in the flying posture of the magnetic head moving between the CSS zone and the data zone can be maintained.

Now, the present invention will be described in detail with reference to Examples. However, it should be understood that the present invention is by no means restricted to such specific Examples.

EXAMPLE 1

Fine particles of silica having an average particle size of primary particles of 300 Å were mixed and dispersed in an amount of 0.02 wt % in an ethanol solution containing a partially hydrolyzed polycondensation product of Si alkoxide (concentration calculated as silica: 1.0 wt %) prepared by hydrolysis/polycondensation of ethyl silicate, to obtain a coating solution. On the other hand, a sodalime glass substrate of a doughnut-shaped plate having an outer diameter of 65 mm, an inner diameter of 25 mm and a thickness of 0.635 mm and having a smooth surface, was prepared. This substrate was supported at two points along the inner circumference and immersed into the above coating solution. Then, it was withdrawn at a rate of 1 mm/sec and then dried under heating, followed by baking at 350° C. for 30 minutes, to obtain a magnetic disk substrate having a surface roughness on its main surface.

With a tape varnishing device, a varnishing treatment was conducted wherein a varnishing tape (manufactured by TMP Company as WA 8000, abrasion material: alumina) was pushed with an air pressure to a rotated magnetic disk substrate at a portion outside a radius of 16 mm of the magnetic disk substrate.

Then, an undercoat layer of Cr having a thickness of about 1500 Å, a magnetic layer of Co-Ni alloy having a thickness of about 600 Å and a protective layer of carbon having a thickness of about 300 Å were formed on the substrate by a sputtering method. Further, a lubricating agent of perfluoropolyether was coated at a thickness of about 30 Å by an immersing method to form a lubricant layer.

The inner circumferential portion of the magnetic disk thus prepared had a peak height of about 290 Å, and the outer circumferential portion of the magnetic disk had a peak height of about 200 Å based on the highest frequency in the height distribution of the surface roughness. No flaw of circular shape produced by the varnishing was not observed at the boundary between the portion outside a radius of 16 mm which was subjected to the varnishing and the other portion.

A CSS test was conducted 50,000 times to a CSS zone of a radius of 15.2 mm of the magnetic disk prepared as above. The friction coefficient measured was about 0.2, and there was found any damage in the outer appearance, and a good result was obtained. Further, measurement of the minimum flying height of a magnetic head was conducted with a flying height tester. As a result, the flying height at a portion inside a radius of 16 mm was about 2 μ inches, and the flying height at a portion outside a radius of 16 mm was 1.2 μ inches or lower. A seaking operation was conducted in the area between the CSS zone and the data zone. As a result, the magnetic head exhibited excellent stability in flying posture without any disturbance of glide noises.

EXAMPLE 2

Fine particles of silica having an average particle size of primary particles of 550 Å were mixed and dispersed in an amount of 0.05 wt % in an ethanol solution containing a partially hydrolyzed polycondensation product of a Si alkoxide (concentration calculated as silica: 1.2 wt %) prepared by hydrolysis/polycondensation of ethyl silicate, to obtain a coating solution. A sodalime glass substrate of a doughnut-shaped plate having the same size as in Example 1 and having a smooth surface, was supported at two points along the inner circumference and immersed in the above coating solution. Then, it was withdrawn at a rate of 2 mm/sec and dried under heating, followed by baking at 350° C. for 30 minutes, to obtain a sample of a magnetic disk substrate having a surface roughness on its main surface.

With the tape varnishing device, a varnishing treatment was conducted wherein a varnishing tape (manufactured by TMP company as GC 8000, abrasion material: silicon carbide) was pushed with an air pressure to the magnetic disk substrate at a portion outside a radius of 16 mm of the magnetic disk substrate while it was rotated. In the same manner as in Example 1, an undercoat layer, a magnetic layer, and a protective layer were formed on the substrate, and further, a lubricant layer was coated to prepare a magnetic disk.

In an inner circumferential portion of the magnetic disk thus prepared, the peak height was about 500 Å and in an outer circumferential portion of it, the peak height was about 270 Å based on the highest frequency of the height distribution of the surface roughness. No flaw of circular form produced by the varnishing was observed in the boundary between the portion inside a diameter of 16 mm of the magnetic disk subjected to the varnishing and the other portion.

A CSS test was conducted 50,000 times to a CSS zone of a radius of 15.2 mm of the magnetic disk thus prepared. The friction coefficient measured was about 0.3 and there was found no damage in the outer appearance and a good result was obtained. Measurement of the minimum flying height of a magnetic head was conducted with the flying height tester. As a result, the flying height at a portion inside a radius of 16 mm was about 3 μ inches, and the flying height at a portion outside a radius of 16 mm was 1.6 μ inches or lower. A seak operation was effected in the area between the CSS zone and the data zone. As a result, the magnetic head exhibited excellent stability in flying posture without the disturbance of glide noises.

EXAMPLE 3

A circular doughnut-shaped magnetic disk substrate of Al alloy having an outer diameter of 65 mm, an inner diameter of 20 mm and a thickness of 0.635 mm was prepared, and a smooth Ni-P plating layer was formed on a main surface of the magnetic disk substrate. A moving abrasive tape was pushed to the main surface of the magnetic disk substrate to form a surface roughness on the entire main surface of the substrate.

While the doughnut-shaped magnetic disk substrate was rotated, a buff impregnated with a coating solution prepared by hydrolysis/polycondensation of ethylsilicate in an ethanol solvent (concentration calculated as silica: 6.0 wt %) was pushed to the main surface of the substrate to apply the coating solution to a data zone outside a radius of 20 mm of the substrate. Then, the substrate was dried under heating and baked at 200° C. for 30 minutes to form an amorphous coating layer on the magnetic disk substrate.

A Cr undercoat layer of a thickness of about 1,500 Å, a Co-Ni alloy type ferromagnetic layer of a thickness of about 600 Å and a carbon protective layer of a thickness of about 300 Å were formed by sputtering on the main surface in a region including the CSS zone and the data zone of the magnetic disk substrate. Further, a lubricant layer of perfluoropolyether of a thickness of about 30 Å was formed by an immersing method.

The peak height in a portion near an inner circumference of the magnetic disk thus formed was about 700 Å, and the peak height in a portion near an outer circumference was about 250 Å based on the highest frequency in the highest distribution of the surface roughness.

A magnetic disk substrate having a surface roughness on its entire main surface was prepared in the same manner above, except that an amorphous coating layer was not formed, and a magnetic disk was prepared by sputtering in the same manner as above.

A CSS test was conducted 50,000 times to the CSS zone of 15.2 mm in the radius direction from the inner circumference of these doughnut-shaped magnetic disks. Measurement of the friction coefficient was conducted to both the magnetic disks to find that the magnetic coefficient of the both disks was about 0.5, and there was found no damage in the outer appearance. An excellent result was obtained. The minimum flying height of a magnetic head in the data zone of an annular region outside a radius of 20 mm from the inner circumference was measured with a glide height tester. The minimum flying height was about 3.0 μ inches in the magnetic disk without having an amorphous coating layer. On the other hand, the flying height was 1.0 μ inch or lower in the magnetic disk wherein an amorphous coating layer was formed in the data zone.

EXAMPLE 4

Fine particles of silica having an average particles size of primary particles of about 550 Å were mixed and dispersed in an amount of 0.05 wt % in an ethanol solution prepared by hydrolysis/polycondensation of ethyl silicate (concentration calculated as silica: 1.2 wt %), to obtain a coating solution. The above coating solution was coated by spin coating on the surface of a magnetic disk substrate made of a sodalime silica glass having the same size as in Example 1 and having a smooth surface, and then dried and baked at 350° C. for 30 minutes, to obtain a magnetic disk substrate having a surface roughness formed over the entire main surface of the substrate.

Then, while rotating this doughnut-shaped magnetic disk substrate at 50 rpm, a coating solution prepared by hydrolysis/polycondensation of ethyl silicate in an ethanol solvent (concentration calculated as silica: 1.0 wt) was dropped and coated on a data zone outside a radius of 20 mm. Then, the substrate was rotated at a speed of 3,000 rpm to form a coated layer by spin coating, which was dried under heating and baked at 350° C. for 30 minutes to form an amorphous coating layer.

In the same manner as in Example 1, an undercoat layer, a ferromagnetic layer, a protective layer and a lubricant layer were sequentially formed on the substrate to prepare a magnetic disk.

The peak height of the magnetic disk in a portion near its inner circumference was about 500 Å, and the peak height in a portion near its outer circumference was about 200 Å based on the highest frequency in the highest distribution of the surface roughness.

On the other hand, a magnetic disk substrate having a surface roughness on its entire main surface which was formed in the same manner as above, but without having an amorphous coating layer was prepared, and a magnetic disk was prepared by sputtering in the same manner as above.

A CSS test was conducted 50,000 times to the CSS zone of the magnetic disk in the same manner as in Example 1 to measure the friction coefficient. As a result, the friction coefficient was about 0.3 in either of the magnetic disks, and there was found no damage in the outer appearance. A good result was obtained. In the same manner as in Example 1, the minimum flying height of a magnetic head in the data zone of annular region outside a radius of 20 mm of the magnetic disk was measured with a glide height tester. As a result, the flying height was about 3.0 μ inches in the magnetic disk without having an amorphous coating layer. However, the flying height was 1.2 μ inches or lower in the magnetic disk having an amorphous coating layer in its data zone.

EXAMPLE 5

Fine particles of silica having an average particle size of primary particles of about 350 Å were mixed and dispersed in an amount of 0.003 wt % in an ethanol solution prepared by hydrolysis/polycondensation of ethyl silicate (concentration calculated as silica: 0.7 wt) to obtain a coating solution. On the surface of a magnetic disk substrate made of an alumino silicate glass having the same size as in Example 1 and having a smooth surface, an undercoat layer and a ferromagnetic layer were formed by sputtering under the same conditions as in Example 1. This disk was supported at one point along the inner circumference of the disk and immersed in the above coating solution. Then, it was withdrawn slowly at a rate of 150 mm/min, then dried under heating and baked at 300° C. for 30 minutes, to obtain a magnetic disk substrate having a surface roughness formed on the entire main surface of the substrate.

An aqueous solution containing sodium arginate and sodium tripolyphosphate at concentrations of 3 wt % and 2 wt %, respectively, was screen printed on this doughnut-shaped magnetic disk substrate inside of a radium of 20 mm and dried to form a coating film of the substances of the aqueous solution. Then, this substrate was further immersed in a coating solution prepared by hydrolysis/polycondensation of ethyl silicate in an ethanol solvent (concentration calculated as silica: 1.0 wt), then withdrawn and dried. Then, this substrate was washed with water to remove the coating film of the substances of the aqueous solution and the coating layer of that portion. Then, the substrate was heated to 300° C. and baked for 30 minutes to form an amorphous coating layer. On the surface of this magnetic disk substrate, a lubricant layer was formed in the same manner as in Example 1 to obtain a magnetic disk.

The peak height in a portion near the inner circumference of the magnetic disk thus formed was about 300 Å, and the peak height in a portion near the outer circumference was about 110 Å based on the highest frequency in the height distribution of the surface roughness.

On the other hand, a magnetic disk having a uniform surface roughness on its entire surface was prepared in the same manner as in Example 1 except that the formation of a coating film of a water-soluble material and the application of a coating solution were not conducted.

In the same manner as in Example 1, a CSS test was conducted 50,000 times to the CSS zone of these magnetic disks to measure the friction coefficient. The friction coefficient measured was about 0.2 in either of the magnetic disks, and there was found no damage in the outer appearance. A good result was obtained. Further, in the same manner as in Example 1, the minimum flying height of a magnetic head in the data zone of annular region outside a radius of 20 mm was measured with a glide height tester. As a result, the flying height was about 1.5 μ inches in the magnetic disk without having an amorphous coating layer. On the other hand, the flying height was 1.0 m inch or lower in the disk having an amorphous coating layer in the data zone.

In accordance with the method of the present invention, it is possible to manufacture with good producibility a magnetic disk wherein a surface roughness is formed on the entire main surface of a magnetic disk substrate and the peak height of the surface roughness in a data zone is lower than the peak height of the surface roughness in a CSS zone, whereby both requirements of excellent CSS characteristics and a low flying height of magnetic head can be satisfied, and a magnetic disk having a high recording density can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing a magnetic disk comprising:
    forming a magnetic disk substrate having a main surface, comprising a data zone and a contact start-stop (CSS) zone, in which a surface roughness having a substantially uniform peak height is formed in the substantially entire portion of the main surface;
    conducting varnishing only to the data zone in the main surface of the substrate to reduce the peak height of the surface roughness of the data zone; and
    forming a ferromagnetic layer, a protective layer and a lubricant layer sequentially on a region of the main surface of the substrate, which includes the data zone and the CSS zone, wherein the peak height of the surface roughness in the data zone of the magnetic disk is lower than the peak height of the surface roughness in the CSS zone.

2. The method for producing a magnetic disk according to claim 1, wherein a protective layer is formed on the ferromagnetic layer.

3. The method for producing a magnetic disk according to claim 1, wherein the surface roughness formed in the substantially entire portion of the main surface of the magnetic disk substrate is obtained by applying a coating solution including dispersed inorganic fine particles onto that portion.

4. The method for producing a magnetic disk according to claim 3, wherein the coating solution including dispersed inorganic fine particles is applied onto the main surface of the magnetic disk substrate, and the substrate is heated at 150° C. or more to bake the applied coating solution, whereby an amorphous coating layer having a surface roughness is formed.

5. The process for producing a magnetic disk according to claim 4, wherein said amorphous coating layer is formed by a hydrolysis/polymerization reaction of a metal alkoxide.

6. The method for producing a magnetic disk according to claim 1, wherein the varnishing is conducted by bringing an abrasive tape, which is held under suspension, into contact with the main surface of the magnetic disk substrate rotated.

7. The method for producing a magnetic disk according to claim 1, wherein the main surface of the CSS zone has a maximum peak height of the surface roughness of from 150 Å to 800 Å based on the highest frequency in the height distribution of the surface roughness, and and the main surface of the data zone has a maximum peak height $h_1$ of the surface roughness and the main surface of the CSS zone has a maximum peak height $h_2$ of the surface roughness wherein $0.4 \leq h_1/h_2 < 0.9$.

8. The method for producing a magnetic disk according to claim 1, wherein an undercoat layer is formed under the ferromagnetic layer.

9. A method for producing a magnetic disk comprising:

forming a magnetic disk substrate having a main surface on which a ferromagnetic layer is formed wherein the ferromagnetic layer comprises a data zone and a contact start-stop (CSS) zone;

forming a surface roughness having a uniform peak height in substantially the entire portion of the surface of the ferromagnetic layer;

conducting varnishing only to the data zone to reduce the peak height of the surface roughness of the data zone, and forming a lubricant layer on a region of the main surface of the substrate, which includes the data zone and the CSS zone, wherein the peak height of the surface roughness in the data zone of the magnetic disk is lower than the peak height of the surface roughness in the CSS zone of the magnetic disk.

10. A method for producing a magnetic disk comprising:

forming a magnetic disk substrate having a main surface comprising a data zone and a contact start stop (CSS) zone, in which a surface roughness having a substantially uniform peak height is formed in the substantially entire portion of the main surface;

applying a coating solution for forming a coating layer only to the data zone in the main surface having a surface roughness of the substrate to thereby reduce the peak height of the surface roughness of the data zone, and forming a ferromagnetic layer, a protective layer and a lubricant layer sequentially on a region of the main surface of the substrate, which includes the data zone and the CSS zone, wherein the peak height of the surface roughness in the data zone of the magnetic disk is lower than the peak height of the surface roughness in the CSS zone of the magnetic disk.

11. The method for producing a magnetic disk according to claim 10, wherein the CSS zone of the main surface has a maximum peak height of the surface roughness of from 150 Å to 800 Å based on the highest frequency in the height distribution of the surface roughness, and the main surface of the data zone has a maximum peak height $h_1$ of the surface roughness and the main surface of the CSS zone has a maximum peak height $h_2$ of the surface roughness wherein $0.4 \leq h_1/h_2 < 0.7$.

12. The method for producing a magnetic disk according to claim 10, wherein an undercoat layer is formed under the ferromagnetic layer.

13. The method for producing a magnetic disk according to claim 10, wherein a protective layer is formed on the ferromagnetic layer.

14. The method for producing a magnetic disk according to claim 10, wherein the coating layer is an amorphous coating layer.

15. The method for producing a magnetic disk according to claim 10, wherein said amorphous coating layer is formed by a hydrolysis/polymerization reaction of a metal alkoxide.

16. The method for producing a magnetic disk according to claim 10, wherein the amorphous coating layer is formed by any one selected from the group consisting of a printing method, a coating method with use of a resin-impregnated buff and a spin-coating method.

17. The method for producing a magnetic disk according to claim 10, wherein the coating layer is patterned by a lift-off method.

18. The method for producing a magnetic disk according to claim 10, wherein the step of forming a surface roughness having a substantially uniform peak height on the entire portion of the magnetic disk substrate is conducted by applying a coating solution including dispersed inorganic fine particles to that portion.

19. A method for producing a magnetic disk comprising:

forming a ferromagnetic layer on the main surface of a magnetic disk substrate, wherein the ferromagnetic layer comprises a data zone and a contact start-stop (CSS) zone;

forming a surface roughness having a substantially uniform peak height on the entire portion of the surface of the ferromagnetic layer;

applying a coating solution for forming an amorphous coating layer only to the data zone to thereby reduce the peak height of the surface roughness of the main surface of the data zone, and forming a lubricant layer in a region of the main surface of the substrate, which includes the data zone and the CSS zone, wherein the peak height of the surface roughness in the data zone of the magnetic disk is lower than the peak height of the surface roughness in the CSS zone of the magnetic disk.

* * * * *